(12) United States Patent
Blanco Varela et al.

(10) Patent No.: US 11,466,136 B2
(45) Date of Patent: Oct. 11, 2022

(54) MULTIFUNCTIONAL DIFFUSION BARRIER

(71) Applicants: Airbus Operations S.L., Getafe (ES); Consiglio Nazionale Delle Ricerche, Rome (IT)

(72) Inventors: Tamara Blanco Varela, Getafe (ES); Jose Sánchez Gómez, Getafe (ES); Silvia Lazcano Ureña, Getafe (ES); Vincenzo Palermo, Rome (IT); Emanuele Treossi, Rome (IT); Nicola Mirotta, Rome (IT)

(73) Assignee: Airbus Operations S.L., Getafe (ES)

( * ) Notice: Subject to any disclaimer, the term of this patent is extended or adjusted under 35 U.S.C. 154(b) by 387 days.

(21) Appl. No.: 16/494,718

(22) PCT Filed: Mar. 16, 2018

(86) PCT No.: PCT/EP2018/056627
§ 371 (c)(1),
(2) Date: Sep. 16, 2019

(87) PCT Pub. No.: WO2018/167255
PCT Pub. Date: Sep. 20, 2018

(65) Prior Publication Data
US 2020/0102437 A1    Apr. 2, 2020

(30) Foreign Application Priority Data
Mar. 17, 2017 (EP) .................................... 17382139

(51) Int. Cl.
| | |
|---|---|
| *B32B 5/02* | (2006.01) |
| *B32B 5/16* | (2006.01) |
| *B32B 5/26* | (2006.01) |
| *B32B 5/30* | (2006.01) |
| *B32B 27/12* | (2006.01) |
| *B32B 27/14* | (2006.01) |
| *B32B 27/18* | (2006.01) |
| *B32B 27/38* | (2006.01) |
| *D06N 3/12* | (2006.01) |
| *C08J 7/06* | (2006.01) |
| *C08J 7/04* | (2020.01) |
| *C08J 3/20* | (2006.01) |
| *D06N 3/00* | (2006.01) |
| *C08J 7/043* | (2020.01) |
| *C08J 7/046* | (2020.01) |
| *C08J 7/048* | (2020.01) |
| *C08K 3/04* | (2006.01) |

(52) U.S. Cl.
CPC ............... *C08J 7/0423* (2020.01); *B32B 5/02* (2013.01); *B32B 5/16* (2013.01); *B32B 5/26* (2013.01); *B32B 5/30* (2013.01); *B32B 27/12* (2013.01); *B32B 27/14* (2013.01); *B32B 27/18* (2013.01); *B32B 27/38* (2013.01); *C08J 3/203* (2013.01); *C08J 7/043* (2020.01); *C08J 7/046* (2020.01); *C08J 7/048* (2020.01); *C08J 7/06* (2013.01); *D06N 3/0063* (2013.01); *D06N 3/12* (2013.01); *B32B 2260/021* (2013.01); *B32B 2260/025* (2013.01); *B32B 2260/046* (2013.01); *B32B 2262/106* (2013.01); *B32B 2264/108* (2013.01); *B32B 2307/7242* (2013.01); *B32B 2307/7265* (2013.01); *B32B 2581/00* (2013.01); *B32B 2605/18* (2013.01); *C08J 2363/00* (2013.01); *C08K 3/042* (2017.05); *D06N 2209/125* (2013.01); *D06N 2209/128* (2013.01)

(58) Field of Classification Search
None
See application file for complete search history.

(56) References Cited

U.S. PATENT DOCUMENTS

| | | |
|---|---|---|
| 5,739,186 A | 4/1998 | Hayakawa et al. |
| 6,287,992 B1 | 9/2001 | Polansky et al. |
| 7,604,049 B2 | 10/2009 | Vaidya et al. |
| 8,110,026 B2 | 2/2012 | Prud'Homme et al. |
| 2010/0096595 A1* | 4/2010 | Prud'Homme ......... C01B 32/23 252/500 |
| 2014/0134354 A1 | 5/2014 | Mazany |

FOREIGN PATENT DOCUMENTS

PL       412700 A1     12/2016

OTHER PUBLICATIONS

International Search Report; priority document.
Soles, C.L et al., J. of Polymer Science: Part B: Polymer Physics. 2000, vol. 38, pp. 792-802.
Kim, Y. et al. Prediction of Deterioration Rate for Composite Material by Moisture Absorption. Journal of the Korean Society of Marine Engineering. 2010, vol. 3, pp. 296-302.
Singh, J.J. et al. Moisture Determination in Composite Materials Using Positron Lifetime Technique. NASA Technical Paper. 1980, p. 1681.
Dean, K. et al. Effect of ultrasonic dispersion methods on thermal and mechanical properties of organoclay epoxy nanocomposites. Macromol. Mater. Eng. 2007, vol. 292, pp. 415-427.
Ferguson, T. et al. Elastic modulus variation due to moisture absorption and permanent changes upon redrying in an epoxy based underfill. IEEE Transactions on Components and Packaging Technologies. 2005, vol. 29, pp. 105-111.

(Continued)

*Primary Examiner* — Sheeba Ahmed
(74) *Attorney, Agent, or Firm* — Greer, Burns & Crain, Ltd.

(57) ABSTRACT

A multifunctional diffusion barrier comprising at least one organic polymer and a 2D graphene or 2D graphene derivative material and a method for preparing the multifunctional barrier. The multifunctional diffusion barrier can be used as a liquid and/or gas barrier, or as structural material, or as sealing material, or as a self-cleaning material or as protective material against UV radiation in aeronautical, automotive, marine or building field. The multifunctional diffusion barrier is suitable in producing parts of aircraft such as a fuel tank, a fuel tank conduit and a gasket.

16 Claims, 4 Drawing Sheets

(56) References Cited

OTHER PUBLICATIONS

Haq, M. et al. Bio-based unsaturated polyester/layered silicate nanocomposites: Characterization and thermo-physical properties. Composites: Part A. 2009, vol. 40, pp. 540-547.
Jang, B.Z. et al., Processing of nanographene platelets (NGPs) and NGP nanocomposites: a review, J. of Material Science. 2008, vol. 43, pp. 5092-5101.
Property Enhancers. Advanced Materials. 2010, vol. 22, pp. 4759-4763.
Database WPI, Week 201707, Thomson Scientific, London, GB.
Xiao Wang et al., Carbon 65 (2013), 324-333.
Yanbin Cui et al., Carbon 98 (2016) 313-333.

\* cited by examiner

MULTIFUNCTIONAL DIFFUSION BARRIER

CROSS-REFERENCES TO RELATED APPLICATIONS

This application claims the benefit of the International Application No. PCT/EP2018/056627, filed on Mar. 16, 2018, and of the European patent application No. 17382139.8 filed on Mar. 17, 2017, the entire disclosures of which are incorporated herein by way of reference.

FIELD OF THE INVENTION

The present invention relates to a multifunctional diffusion barrier comprising at least an organic polymer and a 2D graphene or 2D graphene derivative material. The invention also provides three methods to obtain the multifunctional diffusion barrier.

BACKGROUND OF THE INVENTION

In aeronautical field, fiber reinforced epoxy resin can be used for structural applications in very large amount (about 50% of the weight of the whole aircraft), this material indeed can provide a considerable improvement of the aircraft due to the lower weight, lower costs and higher corrosion resistance compared to metals.

However, a problem related to this kind of material is the water resistance. Reported composite materials containing epoxy resins can absorb between 1 and 7 wt. % moisture [Soles, C. L. et al., J. of Polymer Science: Part B: Polymer Physics. 2000, Vol. 38, pp. 792-802], while the water not absorbed diffuses through the polymeric matrix, plasticizing the polymer and degrading the mechanical properties of the composite [Choi, H. S. et al., Composites: Part A. 2001, Vol. 32, pp. 709-720]. Moreover, water vapors also flow along the filler-matrix interface of the composite, weakening the bond between the filler and the matrix of the composite [Kim, Y. and al., J. of the Korean Society of Marine Engineering. 2010, Vol. 3, pp. 296-302]. Thus, during each flight (going from sea level to high altitude), the absorption-desorption cycles can cause cyclic stress conditions in the outer layers of these materials leading to fatigue damage in the mechanical properties of the composite [Singh, J. J. et al., NASA Technical Paper. 1980, p. 1681; Choi, H. S. et al., Composites: Part A. 2001, Vol. 32, pp. 709-720]. One reported approach discloses the introduction of slightly polar groups into the epoxy resin to reduce the permeability of epoxy resins [Hayakawa, A. et al., U.S. Pat. No. 5,739,186, 1998]. This approach is effective to some extent in reducing the moisture absorption but as a drawback, it increases the melt viscosity making the composite difficult to mold.

Recently, the researchers' attentions have been directed towards using nano size materials in the polymer coating to enhance its protection properties. In particular, disclosures in the prior art report the addition of fillers such as carbon black, silica, talc, nano-clays and the like inside the polymers [Dean, K. et al., Macromol. Mater. Eng. 2007, Vol. 292, pp. 415-427; Ferguson, T. et al., IEEE Transactions on Components and Packaging Technologies, 2005, Vol. 29, pp. 105-111; Haq, M. et al., Composites: Part A. 2009, Vol. 40, pp. 540-547; U.S. Pat. No. 6,287,992 B1, Polansky et al., 2001]. However, initial attempts at producing nanoparticle-filled polymer composites often resulted in materials with inadequate nanoparticle dispersion and degraded mechanical properties. Moreover, the permeability reduction of the composites filled with these nanoparticles is limited by the 3D shape and by the low aspect ratio of the fillers [U.S. Pat. No. 0,142,547 A1, Vaidya, N. Y. et al.].

In another approach, graphene and related materials has been tested to improve the barrier properties of composite materials. Thus, for example, Jang, B. Z. et al. [J. of Material Science. 2008, Vol. 43, pp. 5092-5101] discloses the processes known in the art to prepare graphene nanoplatelet composites. Wang et al. [Carbon, 2013, 65, 324-33] disclose epoxy/graphene nanocomposites wherein the graphene sheets improve the stiffness and fracture toughness of the epoxy resin in the composite. C. Compton et al. [Adv. Material, 2010, 22, 4759-4763] disclose a barrier of a polymer-graphene nanocomposite for reducing the light and the oxygen permeability. Likewise, U.S. Pat. No. 8,110,026 B2 also discloses a gas diffusion barrier of a polymer matrix and graphene fillers resulting from thermally exfoliating graphite oxide.

However, despite the recent developments in composite materials with barrier properties, there is still a need in the art of barriers with improved properties in certain fields of the industry, such as aeronautical, automotive, marine or building fields.

SUMMARY OF THE INVENTION

An object of the present invention is to provide a multifunctional diffusion barrier (from now onwards MDB) having a low weight and improved barrier properties against external agents including corrosive species. Moreover, the MDB of the invention presents other excellent additional features such as heat resistance, chemical resistance or mechanical properties. In addition, the MDB of the invention can improve the chemical and physical stability due to its enhanced gas/liquid barrier properties, for example by reducing the moisture absorption rate.

Therefore, in a first aspect, the invention is directed to a multifunctional diffusion barrier comprising at least an organic polymer and between 0.01 and 99.9% by weight of a 2D graphene or 2D graphene derivative material, wherein the average lateral size of the 2D graphene or 2D graphene derivative material is of between 0.1 µm and 1 mm and has a surface area between 20 and 2600 m2/g, and wherein the multifunctional diffusion barrier is characterized in that it comprises a gradient concentration of the 2D graphene or 2D graphene derivative material.

The gradient concentration of the 2D graphene or 2D graphene derivative material in the MDB of the invention inhibits the diffusion of the external agents at different levels throughout the thickness of the MDB, thereby significantly reducing gas and liquid permeation through the MDB, while avoiding the disadvantages associated with abrupt material changes, such as the change in the properties at the interfaces.

Advantageously, the gradient concentration of the 2D graphene or 2D graphene derivative material in the MDB of the invention may be tailored to present suitable and different properties through the thickness of the MDB in function of the intended application.

Further, in a second aspect, the invention relates to a method to prepare a multifunctional diffusion barrier comprising:

a) providing a 2D graphene or 2D graphene derivative material with an average lateral size of between 0.1 µm and 1 mm and a surface area of between 20 and 2600 m2/g, b) combining all or part of the 2D graphene or 2D graphene derivative material of step a), and an organic polymer, to obtain a first reinforced organic polymer having a content of 2D graphene or 2D graphene derivative material of between 0.01% wt. and 99.9% wt., c) optionally, preparing a second reinforced organic polymer by combining the part of 2D graphene or 2D graphene derivative material of step a) not used in step b) and an organic polymer, being the content of the 2D graphene or 2D graphene derivative material in the resulting second reinforced organic polymer different from that of the first reinforced organic polymer of step b), d) casting the first reinforced organic polymer of step b) and an organic polymer, or optionally, the first reinforced organic polymer of step b) and the second reinforced organic polymer of step c), to obtain a reinforced organic polymer stack with different concentrations through its thickness, e) creating a gradient concentration by partial diffusion of the 2D graphene or 2D graphene derivative material between the organic polymers of the reinforced organic polymer stack of step d) by thermal, electrical or mechanical treatments, and f) curing the reinforced organic polymer stack of step e), to obtain a multifunctional diffusion barrier.

In another aspect, the invention relates to a method to prepare a multifunctional diffusion barrier with only one polymeric layer, comprising:

providing a 2D graphene or 2D graphene derivative material with an average lateral size of between 0.1 µm and 1 mm and a surface area of between 20 and 2600 m2/g, preparing a first reinforced organic polymer having a content of 2D graphene or 2D graphene derivative material of between 0.01% wt. and 90% wt. by combining part of the 2D graphene or 2D graphene derivative material of step a), and an organic polymer and casting it, or providing an organic polymer and casting it, depositing a content between 0.01% to 90% of the 2D graphene or 2D graphene derivative material of step a) on the outermost surface of the first reinforced organic polymer of step b) or on the outermost surface of the organic polymer of step b), creating a gradient concentration by partial diffusion of the 2D graphene or 2D graphene derivative material in the first reinforced organic polymer of step c) or in the organic polymer of step c) forming a second reinforced organic polymer by thermal, electrical or mechanical treatments, and curing the second reinforced organic polymer of step d) to obtain a multifunctional diffusion barrier.

In another aspect the invention relates to a method to prepare a multifunctional diffusion barrier having a multi-layered structure comprising:

a) providing a 2D graphene or 2D graphene derivative material with an average lateral size of between 0.1 µm and 1 mm and a surface area of between 20 and 2600 m2/g, b) combining all or part of the 2D graphene or 2D graphene derivative material of step a), and an organic polymer, to obtain a first reinforced organic polymer having a content of 2D graphene or 2D graphene derivative material of between 0.01% wt. and 99.9% wt., c) optionally, preparing one additional or more reinforced organic polymer(s) by combining a part of 2D graphene or 2D graphene derivative material provided in step a) and not used in step b) and an organic polymer, being the content of the 2D graphene or 2D graphene derivative material lower or higher than the reinforced organic polymer formerly prepared, so that the resulting reinforced organic polymer(s) present(s) an increasing or decreasing content of 2D graphene or 2D graphene derivative material with respect to the first reinforced organic polymer of step b), casting and curing the first reinforced organic polymer of step b), casting another organic polymer, or optionally, the reinforced organic polymer(s) of steps c) over the first reinforced organic polymer of step d), to obtain a reinforced organic polymer stack having increasing or decreasing concentrations through its thickness, and curing the reinforced organic polymer stack of step e) to obtain a multifunctional diffusion barrier having a multilayered structure.

The above mentioned processes of the invention provide simple and straightforward ways for preparing the multifunctional diffusion barrier of the invention. Moreover, the processes of the invention allow obtaining high quality multifunctional diffusion barrier while reducing the production costs.

The invention also relates to the use of the MDB of the invention as a liquid and/or gas barrier, or as structural material, or as sealing material, or as self-cleaning material or as protective material against UV radiation in aeronautical, automotive, marine or building field.

In other aspects the invention refers to liquid and/or gas barrier, sealing material, structural material and/or self-cleaning material comprising the MDB of the invention. Another aspect of the invention relates to an aircraft fuel tank, a fuel tank conduit and/or a gasket comprising the multifunctional diffusion barrier of the invention.

BRIEF DESCRIPTION OF THE DRAWINGS

The accompanying drawings, which are incorporated herein and constitute a part of this specification, illustrate exemplary and non-limiting embodiments of the invention and, together with the written description, serve to explain the principles of the invention. In the drawings.

DETAILED DESCRIPTION OF THE PREFERRED EMBODIMENTS

Figure 1:
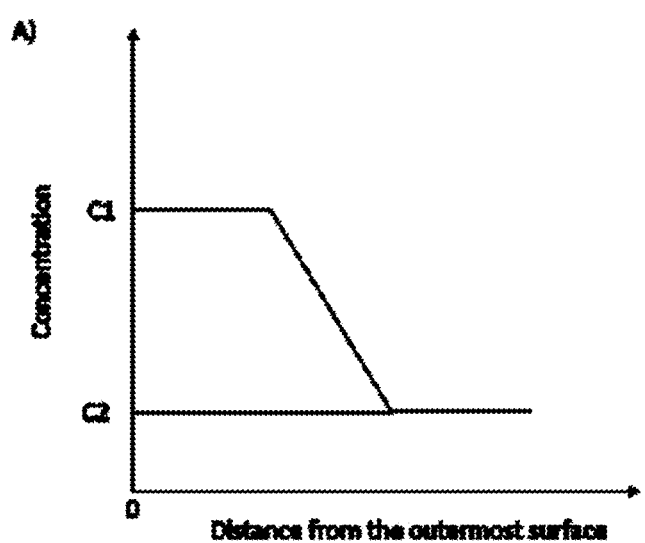
FIG. 1(A-B) shows two exemplary profiles of MDBs of the invention, wherein the graphene content regularly changes with the distance from the outermost surface, between two extreme graphene contents.
Figure 1:
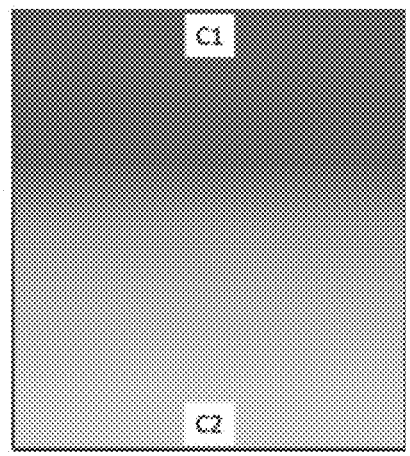
Figure 1:
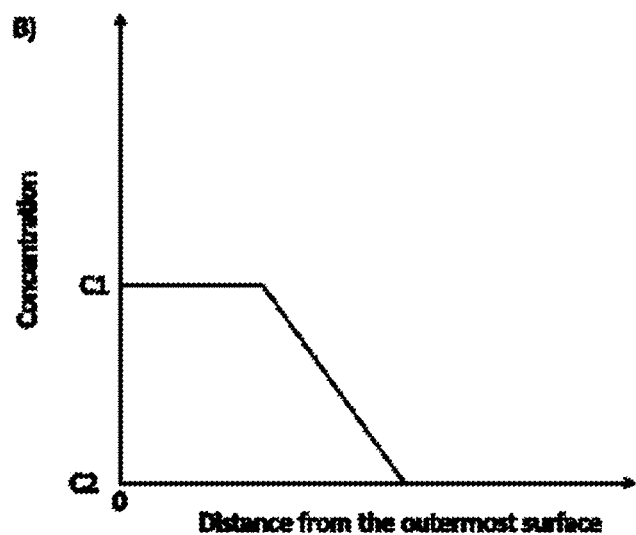
Figure 1:
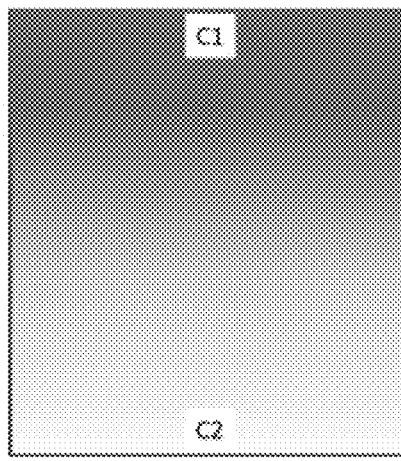

The present invention relates to a multifunctional diffusion barrier (MDB) comprising at least an organic polymer and between 0.01 and 99.9% by weight of a 2D graphene or 2D graphene derivative material, wherein the average lateral size of the 2D graphene or 2D graphene derivative material is of between 0.1 µm and 1 mm and has a surface area between 20 and 2600 m2/g, and wherein the multifunctional diffusion barrier is characterized in that it comprises a gradient concentration of the 2D graphene or 2D graphene derivative material.

In the context of the present invention, the term "multifunctional" refers to at least two main aspects. The first aspect is the protective function of the MDB related to the decreasing of the gas and moisture absorption rate of the component, to the protection from the degradation of chemicals (such as acids, fuels or salty water), to the higher resistance to the swelling action of the solvents, to the self-cleaning properties due to high hydrophobicity (such as for anti-icing in aircraft), to the improved resistance to scratches or to desert sand corrosion (due to optimized tribological properties), to the protection of the composite from UV radiation (thanks to the high absorbing coefficient of the MDB). The second aspect is related to the optimized coupling between 2D graphene or 2D graphene derivative material and the polymeric matrix thanks to the gradient concentration of the filler inside the matrix. The gradient concentration avoids the sharp segregation of the filler in a confined region of the composite that can cause delamination, cracks and defects in the composite completely compromising the barrier effect. Furthermore, the gradient concentration allows a more uniform thermal expansion of the composite. The gradient concentration may be tailored to present suitable and different properties through its thickness in function of the intended application.

In the context of the present invention, the term "external agents" refers to those agents that can degrade the MDB over time. Examples of external agents include moisture, water, solvents, fuel, ice, gases such as oxygen, UV light, erosion agents such as sand, or corrosive species such as acids, salty water or chloride ions.

Preferably, the gradient concentration of 2D graphene or 2D graphene derivative material in the MDB of the invention is oriented in a perpendicular direction with respect to the direction by which the external agents access to the MDB. Thus, for example, if the external agents access to the MDB by the front side, the gradient concentration of 2D graphene or 2D graphene derivative material is perpendicularly oriented to the front side of the MDB.

The MDB of the invention presents an outermost surface. In the context of the present invention the term "outermost surface" refers to the edge surface of the MDB of the invention that is in contact with the external agents. The MDB of the invention may contain one or more outermost surfaces, such as the front side of the MDB, the rear side, the right side and/or the left side of the MDB.

In a preferred embodiment, the invention relates to a multifunctional diffusion barrier (MDB) comprising at least an organic polymer and between 0.01 and 99.9% by weight of a 2D graphene or 2D graphene derivative material, wherein the average lateral size of the 2D graphene or 2D graphene derivative material is of between 0.1 μm and 1 mm, and wherein the multifunctional diffusion barrier is characterized in that it comprises a gradient concentration of the 2D graphene or 2D graphene derivative material oriented in a perpendicular direction with respect to the plane of the outermost surface of the multifunctional diffusion barrier. In the context of the present invention the expression "perpendicular direction to the plane of the outermost surface" refers to the gradient concentration of the 2D graphene or 2D graphene derivative material forming an angle of 90° or of about 90° with respect to the plane of the outermost surface of the MDB of the invention.

The gradient concentration being in a perpendicular direction with respect to the plane of the outermost surface(s) of the MDB of the invention provides the highest protection to the region(s) of the MDB that are prone to the access of external agents. In some cases, when the MDB of the invention has more than one outermost surface, the MDB of the invention may comprise one or more gradient concentrations of 2D graphene or 2D graphene derivative material in respective perpendicular directions with respect to the planes of each outermost surface of the multifunctional diffusion barrier.

In one embodiment, the MDB is coated with paint that covers the outermost surface of the MDB. In another embodiment the MDB is embedded between two materials typically used in aeronautical, automotive, marine or building applications.

The MDB of the present invention comprises an organic polymer and a 2D graphene or 2D graphene derivative material. The MDB of the invention may also comprise two, three or more organic polymers.

The organic polymer may surround, bind and/or support the 2D graphene or 2D graphene derivative material in the MDB of the invention. The 2D graphene and 2D graphene derivative materials, due to their hydrophobicity, are compatible with a broad range of organic polymers. Suitable organic polymers in the present invention include thermoplastic polymers such as polyamide, polyimide, polyurethane, polyether ketones, polyphenylene sulfide, polyetherimide, polyethersulfone, (meth)acrylates such as polymethyl methacrylate, epoxies, polyolefines such as polypropylene, polystyrene and blends thereof.

In particular, for aerospace applications, aerospace-grade resins are used having four epoxide groups in each epoxy monomer molecule to form multiple connections. Typically, the molecules are tri- or tetra-functional epoxies and bifunctional amines.

In a preferred embodiment, the organic polymer is a monocomponent epoxy resin or a bi-component epoxy resin of an epoxy resin and a hardener. The epoxy resin can be a bifunctional epoxy resin, such as diglycidyl ether of bisphenol A (DGEBA), trifunctional epoxy resin, such as Novolac Epoxies, or tetrafunctional epoxy resin such as N,N'-tetraglycidyl methylene dianiline (TGMDA) and combinations thereof, with a cure agent or hardener, such as an amine, amide, acid, acid anhydride, alcohol, phenol, thiol, sulfone.

The MDB of the invention comprises a 2D graphene or 2D graphene derivative material and an organic polymer.

The term "2D graphene material" in the context of the present invention refers to a bi-dimensional structure wherein covalently bonded carbon atoms are densely packed in a honeycomb lattice structure in a planar sheet. Graphene is regarded as the bi-dimensional 'building-block' of graphite. Hence, the graphite structure may be described as a laminar structure wherein layers of graphene are arranged one on top of each other to make a three-dimensional structure. The term "2D graphene derivative material" or "graphene derivative material" refers to bi-dimensional materials having graphene as a building-block structure.

In one particular embodiment, the 2D graphene or 2D graphene derivative material in the MDB of the invention is selected from graphene, graphene nanoplatelets, graphene nanosheets, graphene nanoribbons, graphene oxide, exfoliated graphene, reduced graphene oxide, multilayer graphene and combinations thereof.

In another particular embodiment, the 2D graphene or 2D graphene derivative material in the MDB of the invention is chemically or supramolecular functionalized with molecules containing hydrophobic groups selected from aryl chains, alkyl chains, fluorinated or partially fluorinated groups, silicon derivatives and combinations thereof. The organic polymer of the MDB of the invention is preferably matched to the chemistry of the surface functionalization on the functionalized graphene to form strong bonds between the organic polymer and the functionalized 2D graphene or 2D graphene derivative material.

In one particular embodiment, the 2D graphene or 2D graphene derivative material and the organic polymer form a tridimensional network in the MDB of the invention. Thus, for example, when an expandable thermoplastic polymer is used, the polymer forms a tridimensional network with the 2D graphene or 2D graphene derivative material. The resulting MDB presents impervious properties.

In the MDB of the invention, the content of the 2D graphene or 2D graphene derivative material is of between 0.01 and 99.9% by weight. In one particular embodiment, the content of the 2D graphene or 2D graphene derivative material is of between 0.01 and 50% by weight. Preferably, the content of the 2D graphene or 2D graphene derivative material is of between 0.1 and 40% by weight, more preferably between 0.5 and 35% by weight, more preferably between 1 and 30% by weight, even more preferably between 3 and 25% by weight, even more preferably between 5 and 20% by weight, even more preferably between 7 and 10% by weight.

In another particular embodiment, the content of the 2D graphene or 2D graphene derivative material in the MDB of the invention is of between 51 and 99.9% by weight. Preferably, the content of the 2D graphene or graphene derivative material is of between 60 and 95% by weight, more preferably between 70 and 90% by weight, even more preferably between 75 and 85% by weight, even more preferably between 77 and 80% by weight.

It is known in the art that graphene hinders crack propagation and induces the crack deviation in graphene composites, improving its mechanical strength [Wang et al., Carbon, 2013, 65, 324-33]. However, a partial or complete delamination at the interface with the polymeric material is generally produced when graphene composites are subjected to crack propagation.

By contrast, the MDB of the invention comprising a gradient concentration of the 2D graphene material or 2D graphene derivative material, increases the homogeneity of the mechanical properties of the material through the thickness of the barrier, avoiding the breakage of the composite. Moreover, the gradient concentration of the 2D graphene or 2D graphene derivative material in the MDB of the invention may be tailored to present suitable and different properties through its thickness in function of the intended application. Thus, for example, it is expected that the stiffness of the MDB of the invention increases with the content of the 2D graphene or 2D graphene derivative material. Moreover, it is also expected that the deformation ability of the MDB of the invention decreases with the content of 2D graphene or 2D graphene derivative material.

Furthermore, in the MDB of the invention the 2D graphene or 2D graphene derivative material provides a 'tortuous path' to the external agents trying to diffuse through the thickness of the MDB. For example, when the external agent is a gas, the 2D graphene or 2D graphene derivative material hinders the movement of the gas molecules that diffuse through the thickness of the MDB. Thus, the gas molecules must maneuver around the 2D graphene or 2D graphene derivative material to go through the thickness of the MDB of the invention. Moreover, the high hydrophobicity of the 2D graphene or 2D graphene derivative material also reduces the permeability to external agents in the MDB of the invention.

The average lateral size of the 2D graphene or graphene derivative material is of between 0.1 µm and 1 mm. In the context of the present invention by the term "average lateral size" it is understood to be the mean size of the largest dimension of each particle of the 2D graphene or 2D graphene derivative material in the MDB of the invention.

In a preferred embodiment the average lateral size of the 2D graphene or 2D graphene derivative material is of between 0.5 µm and 500 µm, more preferably between 0.7 µm and 200 µm, more preferably between 1 µm and 150 µm, more preferably between 40 µm and 70 µm, more preferably between 50 and 60 µm.

The average lateral size of the 2D graphene or 2D graphene derivative material of the MDB of the invention influences the permeation, particularly gas and liquid permeation, through the thickness of the MDB of the invention. Thus, a higher average lateral size is generally associated with an increased barrier resistance.

In one particular embodiment, the 2D graphene or 2D graphene derivative material in the MDB of the invention has a surface area between 20 and 2600 m2/g, preferably between 50 and 2000 m2/g, more preferably between 100 and 1500 m2/g, even more preferably between 200 and 1000 m2/g.

In a preferred embodiment the 2D graphene or 2D graphene derivative material presents a lateral size over 50 µm and a surface area of at least 70 m2/g.

The MDB of the invention comprises a gradient concentration of the 2D graphene or 2D graphene derivative material. In the context of the present invention, the term "gradient concentration" refers to the 2D graphene or 2D graphene derivative material concentration which changes throughout the thickness of the MDB of the invention. In a particular embodiment, the gradient concentration of the 2D graphene or 2D graphene derivative material is oriented in a perpendicular direction to the plane of the outermost surface of the MDB, so that the concentration of 2D graphene or 2D graphene derivative material changes in a perpendicular direction with respect to the plane of the outermost surface.

In one particular embodiment, the MDB of the invention further comprises a prepreg layer, fiber textile, or a fabric, and the gradient concentration of the 2D graphene or 2D graphene derivative material is oriented in a perpendicular direction with respect to the prepreg layer, fiber textile or fabric.

In another particular embodiment, the MDB of the invention further comprises carbon fibers or glass fibers, and the gradient concentration of the 2D graphene or 2D graphene derivative material is radially oriented along the carbon fibers or glass fibers.

FIGS. 1(A and B) represents two exemplary profiles of MDBs of the invention, wherein the graphene content changes between two extreme contents. In particular, the linear slope of both profiles shows a regular and continuous change between the two graphene contents in the MDBs of the invention.

Figure 2:
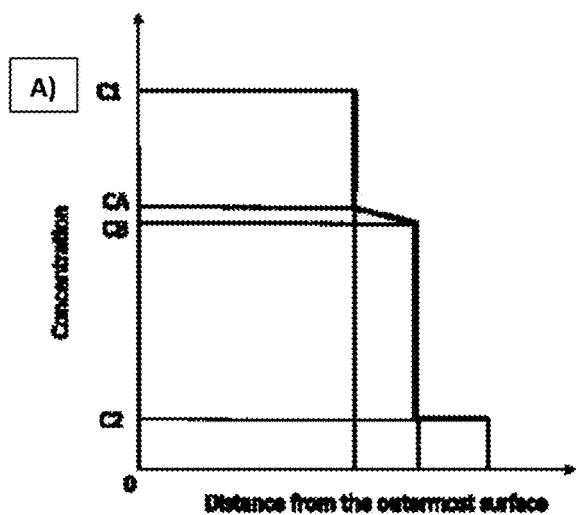
FIG. 2(A-B-C) shows three exemplary profiles of MDBs of the invention, wherein the graphene content changes with the distance from the outermost surface, at different levels through the thickness of the MDB.
Figure 2:
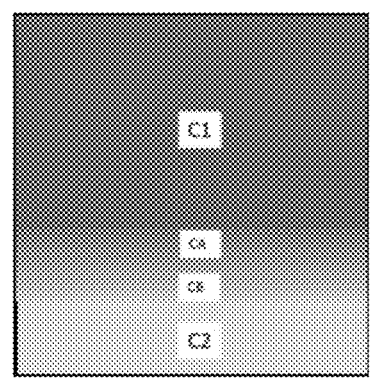
Figure 2:
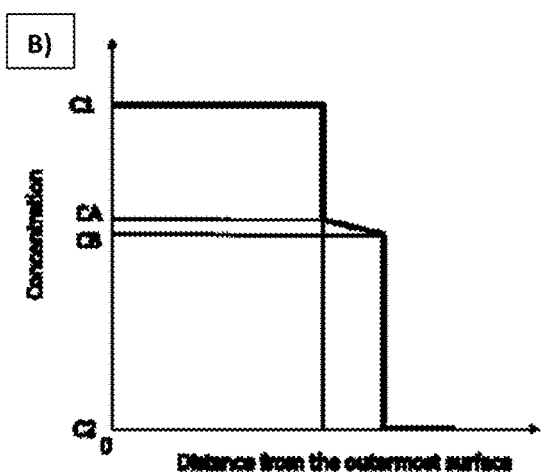
Figure 2:
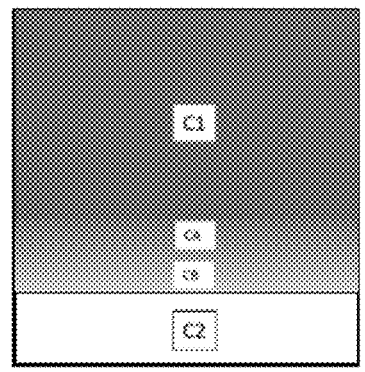
Figure 2:
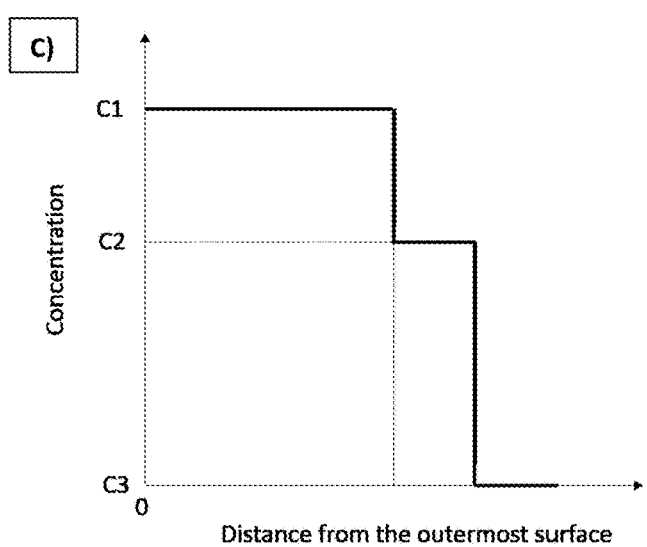
Figure 2:
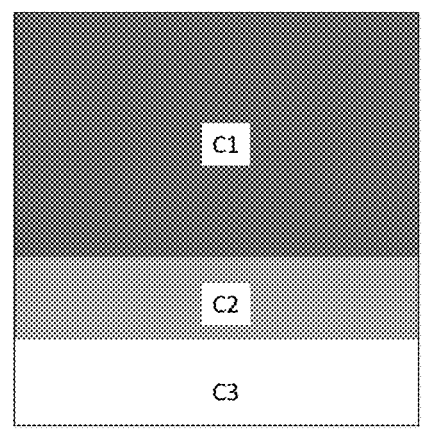

FIGS. 2(A, B and C) shows three exemplary MDBs of the invention wherein the graphene content progressively changes at different levels through the thickness of the MDB. The gradient concentration of the 2D graphene or 2D graphene derivative material of the MDB of the invention, avoids the abrupt material changes at different levels through the thickness of the MDB depending on the particular profile, and provides uniform and continuous mechanical and thermal properties, while maintaining the barrier properties of the MDB of the invention.

The gradient concentration may be any suitable gradient as deemed appropriate for the intended use. Preferably, the gradient concentration is continuous or stepwise.

In a particular embodiment, the gradient concentration is stepwise, as shown for example in FIG. 2C). In a preferred embodiment, when the MDB of the invention presents a multilayered structure of two or more layers, the gradient concentration of 2D graphene or 2D graphene derivative material is stepwise, namely the 2D graphene or 2D graphene derivative material content is a constant content of between 0 and 99.9% by weight in each layer, and is increased or decreased in each layer with respect to the previous layer.

In one particular embodiment, the gradient concentration of the 2D graphene or 2D graphene derivative material increases in a perpendicular direction away from the plane of the outermost surface. In this particular embodiment, the relative content of 2D graphene or 2D graphene derivative material is lower near the outermost surface and higher as the distance from the outermost surface increases in the MDB of the invention.

In one preferred embodiment, the gradient concentration of the 2D graphene or 2D graphene derivative material decreases in a thickness direction away from the plane of the outermost surface. In this particular embodiment the relative content of 2D graphene or 2D graphene derivative material increases to a maximum at or near the outermost surface of the MDB of the invention.

In a particular embodiment, the major amount, namely the majority, of 2D graphene or 2D graphene derivative material is located at the outermost surface of the multifunctional diffusion barrier of the invention. FIGS. 1 and 2 show exemplary profiles of MDBs of the invention wherein the major amount of 2D graphene or 2D graphene derivative material is located at the outermost surface. The major amount of 2D graphene or 2D graphene derivative material located at or near the outermost surface of the MDB of the invention improves the barrier properties of the MDB on the region, such as the mechanical properties of the outermost surface.

Moreover, the gradient concentration produces optical properties while retaining the improved barrier properties of the MDB of the invention. In particular, the gradient composition of the 2D graphene or 2D graphene derivative material produces changes in the refractive index through the layer, for example, going from a high refractive index to a low refractive index.

In one particular embodiment, the outermost surface of the MDB of the invention is patterned. The term "patterned surface" in the context of the present invention refers to the surface of the MDB of the invention having a plurality of micro- or nanometric protrusions. The protrusions in the MDB of the invention may have any common regular and/or irregular shapes, such as a spherical shape, elliptical shape, cubical shape, tetrahedral shape, pyramidal shape, octahedral shape, cylindrical shape, cylindrical shape, polygonal pillar-like shape, conical shape, columnar shape, tubular shape, helical shape, funnel shape, or dendritic shape. Each of the protrusions may have the same or different shape, height, and width. In a particular embodiment, the protrusions have a columnar shape or a conical shape.

In another particular embodiment, the MDB further comprises a 2D material selected from h-BN, MoS2, NbSe2, WS2, NiS2, MoSe2, WSe2, VSe2, TiS2 and combinations thereof. Different 2D materials can change some properties of the MDB of the invention like optical, electrical and thermal properties. For example, these additional fillers may fill in the space in the polymeric matrix between the 2D graphene or 2D graphene derivative material hindering the electrical current flow among the platelets of the MDB of the invention, for example when the 2D material is bidimensional Boron Nitride. Typically, these fillers may not be used in an amount greater than about 30% by weight of the MDB.

In one particular embodiment, the MDB of the invention further comprises natural or synthetic textiles or fabrics, a prepreg layer, fibers, whiskers, platelets, particles or combinations thereof, which will reinforce the MDB. Preferably, the MDB of the invention further contains fibers selected from carbon fibers and glass fibers.

In one particular embodiment, the MDB of the present invention is a multilayered structure containing two or more layers, wherein each layer comprises an organic polymer and 2D graphene or 2D graphene derivative material having an average lateral size of between 0.1 µm and 1 mm, and wherein the content of the 2D graphene or 2D graphene derivative material in each layer is a constant content of between 0 and 99.9% by weight, and the 2D graphene or 2D graphene derivative material content is increased or decreased in each layer with respect to the previous layer, so that a stepwise gradient concentration of the 2D graphene or 2D graphene derivative material in a perpendicular direction with respect to the plane of the outermost surface is present. When the MDB of the invention presents a multilayered structure, the content of 2D graphene or 2D graphene derivative is constant in each layer, and the 2D graphene or 2D graphene derivative material content is increased or decreased in each layer with respect to the previous layer, producing a stepwise gradient concentration of the 2D graphene or 2D graphene derivative material. FIG. 2C shows an exemplary stepwise profile of an MDB of the invention having a multilayered structure of three layers, wherein a constant content of graphene is maintained in each layer, and the graphene content is decreased in each layer with respect to the previous layer as the distance from the outermost surface increases. The thickness and content of graphene in each layer of the multilayered structure may be tuned to avoid abrupt changes in the properties of the MDB of the invention. In a preferred embodiment, the MDB of the present invention is a multilayered structure containing three or four layers. In another preferred embodiment, the MDB of the present invention is a multilayered structure wherein the organic polymers of the layers are the same or different.

In one embodiment, the form of the multifunctional diffusion barrier of the invention is selected from bulk material, a foil, a thin film, a prepreg, a laminate, a coating, a roll, a sheet, a layer, paint, primer, a reinforced plastic or resin and an additive. Preferably, the MDB of the invention presents a form selected from a foil, a thin film, a laminate, a coating, a sheet and a layer. In one particular embodiment, the MDB of the invention is in form of a thin polymeric film, or as a layer, having a thickness of between 10 µm and 1 mm, preferably of between 30 µm and 100 µm, more preferably of between 50 µm and 80 µm.

The MDB of the invention can be used as a free-standing material, adhered onto a surface, or coated on a surface of a product. In a preferred embodiment, the MDB of the invention in form of a thin polymeric film, or as a layer, is deposited or attached to the component by hot press or glues, before or after curing. In another preferred embodiment, the MDB of the invention in form of a layer is grown or applied on the surface of an aircraft component.

In one particular embodiment, the MDB of the invention is in form of a protective coating, primer, or paint. Preferably, the MDB of the invention in a form of a protective coating, primer, or paint, is deposited by spray-coating directly on the component and then cured at a certain temperature.

In one particular embodiment, the MDB of the invention is in the form of a tridimensional network obtained by the thermal expansion of an expandable thermoplastic polymer mixed with 2D graphene or 2D graphene derivative material during curing process.

In one particular embodiment, the invention relates to a product having at least a surface coated with the MDB of the invention. The product coated with the MDB of the invention may have one or more surfaces coated with the composite of the invention. Suitable products that may be coated with the MDB of the invention include products made of reinforced polymeric composites, plastics, glass, metals, stainless steel and ceramics. Preferred products coated with the MDB of the invention include parts of an aircraft, such as fuselage, wings and stabilizers.

In one aspect, the invention relates to the method to obtain the MDB of the invention, comprising:

a) providing a 2D graphene or 2D graphene derivative material with an average lateral size of between 0.1 μm and 1 mm and a surface area of between 20 and 2600 m2/g, b) combining all or part of the 2D graphene or 2D graphene derivative material of step a), and an organic polymer, to obtain a first reinforced organic polymer having a content of 2D graphene or 2D graphene derivative material of between 0.01% wt. and 99.9% wt., c) optionally, preparing a second reinforced organic polymer by combining the part of 2D graphene or 2D graphene derivative material of step a) not used in step b) and an organic polymer, being the content of the 2D graphene or 2D graphene derivative material in the resulting reinforced organic polymer different from that of step b), d) casting the first reinforced organic polymer of step b) and an organic polymer, or optionally, the first reinforced organic polymer of step b) and the second reinforced organic polymer of step c), to obtain a reinforced organic polymer stack with different concentrations through its thickness, e) creating a gradient concentration by partial diffusion of the 2D graphene or 2D graphene derivative material between the organic polymers of the reinforced organic polymer stack of step d) by thermal, electrical or mechanical treatments, and f) curing the reinforced organic polymer stack of step e) to obtain a multifunctional diffusion barrier.

According to step a), 2D graphene or 2D graphene derivative material with an average lateral size of between 0.1 μm and 1 mm and a surface area of between 20 and 2600 m2/g is provided. Preferably, the average lateral size of the provided 2D graphene or graphene derivative material is of between 0.5 μm and 500 μm, more preferably between 0.7 μm and 200 μm, more preferably between 1 μm and 150 μm, more preferably between 40 μm and 70 μm, more preferably between 50 μm and 60 μm. Preferably, the surface area of the 2D graphene or 2D graphene derivative material in the MDB of the invention is of between 20 and 2600 m2/g, more preferably between 50 and 2000 m2/g, more preferably between 100 and 1500 m2/g, even more preferably between 200 and 1000 m2/g. In a preferred embodiment the 2D graphene or 2D graphene derivative material provided in step a) presents a lateral size over 50 μm and a surface area of at least 70 m2/g.

In one particular embodiment, the 2D graphene material or 2D graphene derivative material provided in step a) is selected from graphene nanoplatelets, graphene, graphene nanosheets, graphene nanoribbons, graphene oxide, exfoliated graphene, reduced graphene oxide, multilayer graphene and combinations thereof.

In one particular embodiment, the 2D graphene or graphene derivative material provided in step a) is chemically or supramolecular functionalized with molecules containing hydrophobic groups selected from aryl chains, alkyl chains, fluorinated or partially fluorinated groups, silicon derivatives and combinations thereof.

According to step b), all or part of the 2D graphene or 2D graphene derivative material of step a), and an organic polymer, are combined to obtain a first reinforced organic polymer having a content of 2D graphene or 2D graphene derivative material of between 0.01% wt. and 99.9% wt. The 2D graphene or 2D graphene derivative material and the organic polymer may be combined for example with a high shear mixer, a three-roll miller, or by dispersion of the graphene in a solvent followed by the removal of the solvent.

In one particular embodiment, the content of the 2D graphene or graphene derivative material is of between 0.01 and 99.9% by weight, preferably between 0.01 and 50% by weight, preferably between 0.1 and 40% by weight, more preferably between 0.5 and 35% by weight, more preferably between 1 and 30% by weight, even more preferably between 2 and 20% by weight, even more preferably between 5 and 15% by weight, even more preferably between 7 and 10% by weight.

In another particular embodiment, the content of the 2D graphene or 2D graphene derivative material is of between 51 and 99.9% by weight. Preferably, the content of the 2D graphene or graphene derivative material is of between 60 and 95% by weight, more preferably between 70 and 90% by weight, even more preferably between 75 and 85% by weight, even more preferably between 77 and 80% by weight.

Suitable organic polymers in the method of the invention include thermoplastic polymers such as polyamide, polyimide, polyurethane, polyether ketones, polyphenylene sulfide, polyetherimide, polyethersulfone, (meth)acrylates such as polymethyl methacrylate, epoxies, polyolefines such as polypropylene, polystyrene and blends thereof. In particular, for aerospace applications, aerospace-grade resins are used having four epoxide groups in each epoxy monomer molecule to form multiple connections. Typically, the molecules are tri- or tetra-functional epoxies and bifunctional amines.

In a preferred embodiment, the organic polymer is an epoxy resin or a bi-component epoxy resin of an epoxy resin and a hardener. The epoxy resin can be a bifunctional epoxy resin, such as diglycidyl ether of bisphenol A (DGEBA), trifunctional epoxy resin, such as Novolac Epoxies, or tetrafunctional epoxy resin such as N,N'-tetraglycidyl methylene dianiline (TGMDA) and combinations thereof, with a cure agent or hardener, such as an amine, amide, acid, acid anhydride, alcohol, phenol, thiol and sulfone.

Figure 3:
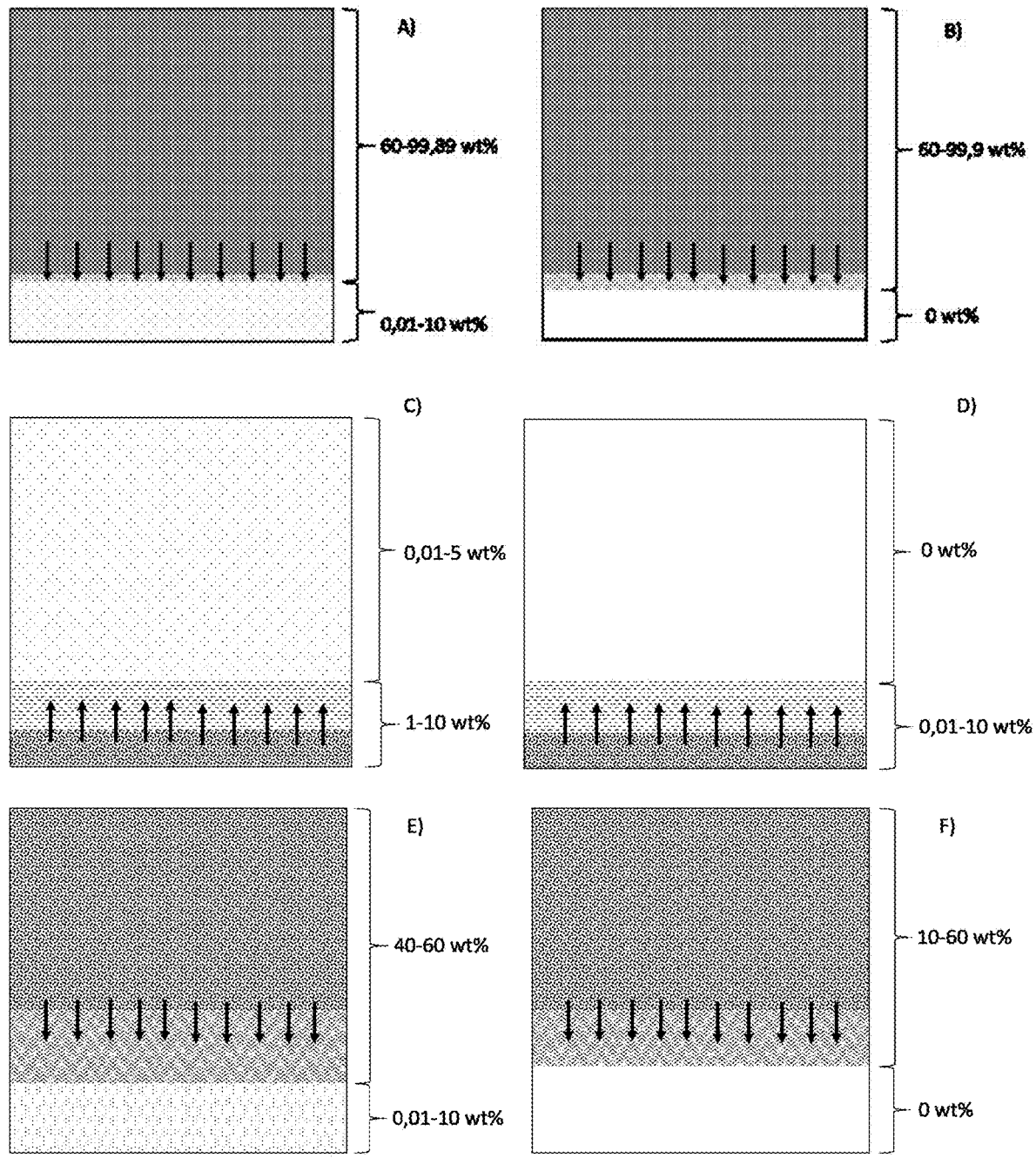
FIG. 3(A-B-C-D-E-F) shows schematic cross-sections of six multifunctional barriers of the invention for different 2D graphene or 2D graphene derivative material concentrations, showing the gradient concentration of graphene material in the perpendicular direction with respect to the plane of the outermost surface.

In step c), a second reinforced organic polymer may be optionally prepared by combining the part of 2D graphene or 2D graphene derivative material of step a) not used in step b) and an organic polymer, being the concentration of the 2D graphene or 2D graphene derivative material in the resulting reinforced organic polymer different from that of step b). In the method of the invention, step c) is an optional step directed to prepare a second reinforced organic polymer having a content of 2D graphene or 2D graphene derivative material different from that of the reinforced organic polymer of step b). Thus, for example, the content of 2D graphene material or 2D graphene derivative in the first reinforced organic polymer of step b) may be of about 60-99.89% by weight, and the content of 2D graphene material or 2D graphene derivative in the second reinforced organic polymer of step c) may be of about 0.01% to 10% by weight as shown in FIG. 3A. In another example, the content of 2D graphene material or 2D graphene derivative in the first reinforced organic polymer of step b) may be of about 60-99.9% by weight, and there is no 2D graphene or 2D graphene derivative material (0%) in the organic polymer of step c), as shown in FIG. 3B. FIG. 3C-E show further additional examples wherein the content of 2D graphene or 2D graphene derivative material in the first reinforced organic polymer is different to that of the second organic polymer.

Suitable organic polymers in step c) include those above mentioned in step b). In one particular embodiment, the organic polymers according to step b) and step c) are different one from each other.

In one particular embodiment, a 2D material selected from h-BN, MoS2, NbSe2, WS2, NiS2, MoSe2, WSe2, VSe2, TiS2 and combinations thereof is further added in steps b) and/or c) of the method of the invention. The added amount of the 2D material different from 2D graphene or 2D graphene derivative material in the method of the invention may be different or identical to the content of the 2D graphene or 2D graphene derivative material. In a more preferred embodiment, the 2D material different from 2D graphene or 2D graphene derivative material, is added in steps b) and c), in a different amount to that of the 2D graphene or 2D graphene derivative material in the MDB. In another preferred embodiment, the 2D material different from 2D graphene or 2D graphene derivative is added in step c) of the method of the invention.

In another particular embodiment, natural or synthetic textiles or fabrics, a prepreg layer, fibers, whiskers, platelets, particles or fibers selected from carbon fibers and glass fibers and combinations thereof, are further added in steps b) and/or c).

According to step d), the first reinforced organic polymer of step b) and an organic polymer, or optionally, the first reinforced organic polymer of step b) and the second reinforced organic polymer of step c) are cast, to obtain a reinforced organic polymer stack with different concentrations through its thickness. The organic polymers forming the resulting stack may be all reinforced or only some of them.

The term "casting" in the present invention refers to the process of depositing two or more layers of the material of steps b) and c), one on top of the other into a mold or onto a substrate. The process of depositing the layer(s) can be carried out for example by spray coating, blade coating, rod coating, or any other deposition techniques known in the art.

In the method of the invention if optional step c) is not carried out, the first reinforced organic polymer of step b) and an organic polymer are cast in step d).

Figure 4:
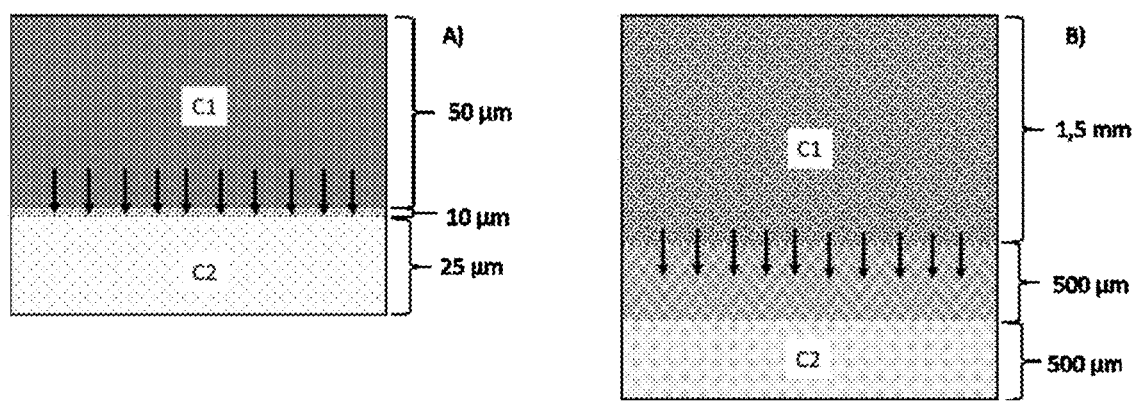
FIG. 4(A-B) shows schematic cross-sections of multifunctional barriers of the invention wherein the thickness of the regions of the MDB of the invention having different concentration is represented.

According to step e), a gradient concentration is created by partial diffusion of the 2D graphene or 2D graphene derivative material between the organic polymers of the reinforced organic polymer stack of step d) by thermal, electrical or mechanical treatments. The gradient concentration is created, by partial diffusion of the 2D graphene or 2D graphene derivative material between the adjacent layers of the organic polymers from step d), by thermal, electrical or mechanical treatments. FIGS. 4(A and B) shows exemplary MDBs of the invention wherein 2D graphene or 2D graphene derivative materials diffuse between two reinforced organic polymer materials to different depths in the MDB of the invention.

According to step f) the reinforced organic polymer stack of step e) is cured, to obtain a multifunctional diffusion barrier.

The term "cure" in the context of the present invention refers to the toughening or hardening of a polymer material by the use of heat, radiation or reaction with chemical additives. The term also refers to the process of expansion of an expandable thermoplastic polymer. The diffusion of the 2D graphene or 2D graphene derivative material between the adjacent reinforced or not reinforced organic polymers in the stack that starts in step e) may continue during the curing step, producing the multifunctional diffusion barrier of the invention. The diffusion between the adjacent polymeric layers may be enhanced by increasing the time and temperature during the curing step.

Another aspect of the invention relates to another method to prepare a multifunctional diffusion barrier of the invention, wherein the MDB contains only one organic polymeric According to this method, 2D graphene or 2D graphene derivative material is deposited on the outermost surface of the organic polymer and eventually mixed with the organic polymer. A gradient concentration is created by partial diffusion of the 2D graphene or 2D graphene derivative material from the outermost surface through the organic polymer by thermal, electrical or mechanical treatments. In particular, the method comprises:

providing a 2D graphene or 2D graphene derivative material with an average lateral size of between 0.1 µm and 1 mm and a surface area of between 20 and 2600 m2/g, preparing a first reinforced organic polymer having a content of 2D graphene or 2D graphene derivative material of between 0.01% wt. and 90% wt. by combining part of the 2D graphene or 2D graphene derivative material of step a), and an organic polymer and casting it, or providing an organic polymer and casting it, depositing a content between 0.01% to 90% of the 2D graphene or 2D graphene derivative material of step a) on the outermost surface of the first reinforced organic polymer of step b) or on the outermost surface of the organic polymer of step b), creating a gradient concentration by partial diffusion of the 2D graphene or 2D graphene derivative material in the reinforced organic polymer of step c) or in the organic polymer of step c) forming a second reinforced organic polymer by thermal, electrical or mechanical treatments, and curing the second reinforced organic polymer of step d) to obtain a multifunctional diffusion barrier.

Another aspect of the invention relates to the method to prepare a multifunctional diffusion barrier having a multi-layered structure containing two or more layers, wherein each layer comprises an organic polymer and 2D graphene or 2D graphene derivative material having an average lateral size of between 0.1 µm and 1 mm, and wherein the content of the 2D graphene or 2D graphene derivative material in each layer is a constant content of between 0 and 99.9% by weight and the 2D graphene or 2D graphene derivative material content is increases or decreased in each layer with respect to the previous layer, so that a stepwise gradient concentration of the 2D graphene or 2D graphene derivative material in a perpendicular direction with respect to the plane of the outermost surface is present. The method comprises:

a) providing a 2D graphene or 2D graphene derivative material with an average lateral size of between 0.1 µm and 1 mm and a surface area of between 20 and 2600 m2/g, b) combining all or part of the 2D graphene or 2D graphene derivative material of step a), and an organic polymer, to obtain a first reinforced organic polymer having a content of 2D graphene or 2D graphene derivative material of between 0.01% wt. and 99.9% wt., c) optionally, preparing one additional or more reinforced organic polymer(s) by combining a part of 2D graphene or 2D graphene derivative material provided in step a) and not used in step b) and an organic polymer, being the content of the 2D graphene or 2D graphene derivative material lower or higher than the reinforced organic polymer formerly prepared, so that the resulting reinforced organic polymer(s) present(s) an increasing or decreasing content of 2D graphene or 2D graphene derivative material with respect to the first reinforced organic polymer of step b), d) casting and curing the first reinforced organic polymer of step b), e) casting another organic polymer, or optionally, the reinforced organic polymer(s) of steps c) over the first reinforced organic polymer of step d), to obtain a reinforced organic polymer stack having increasing or decreasing concentrations through its thickness, and f) curing the reinforced organic polymer stack of step e) to obtain a multifunctional diffusion barrier having a multilayered structure.

Preferably, the multifunctional diffusion barrier of the invention is a multilayered structure containing more than two layers of composites according to steps b) and c), so that the concentration of the 2D graphene or 2D graphene derivative material changes in every layer, producing a gradient concentration throughout the thickness of the MDB according to step e) and f). In one preferred embodiment, some of the layers in the MDB of the invention contain a concentration of 2D graphene or 2D graphene derivative material equal to 0%.

The resulting MDB may be of any suitable size or shape for an intended purpose. As will be understood by those skilled in the art, MDB of any size can be made. Further, the gradient concentration of the 2D graphene or 2D graphene derivative material in the resulting MDB may be tuned according to the intended application.

In one particular embodiment, the invention relates to the MDB obtained by the method of the invention. The MDB obtained by the method of the invention comprises one organic polymer and between 0.01 and 99.9% by weight of a 2D graphene or 2D graphene derivative material, wherein the average lateral size of the 2D graphene or 2D graphene derivative material is of between 0.1 µm and 1 mm, and wherein the MDB is characterized in that the multifunctional diffusion barrier comprises a gradient concentration of the 2D graphene or 2D graphene derivative material.

The MDB of the present invention is useful in a wide variety of applications where diffusion barriers with a low weight would be desirable. Thus, one aspect of the present invention relates to the use of the multifunctional diffusion barrier of the invention in aircraft. Thus, for example the MDB of the invention can be used in the fuselage or air wings in aircraft.

Another aspect of the invention relates to the use of the multifunctional diffusion barrier of the invention as a liquid and/or gas barrier, or as structural material, or as sealing material, or as a self-cleaning material or as protective material against UV radiation in aeronautical, automotive, marine or building field. In a preferred embodiment, the MDB of the invention is used in aircraft as a liquid and/or gas barrier, or as structural material, or as sealing material, or as a self-cleaning material or as protective material against UV radiation.

Moreover, the MDB of the present invention may serve as a liquid and/or gas barrier. Thus, one aspect of the present invention relates to the liquid and/or gas barrier comprising the MDB of the invention.

In other possible application, the MDB of the present invention may serve as a sealing material. Thus, one aspect of the present invention relates to the sealing material comprising the MDB of the invention.

In other possible application, the MDB of the present invention may serve as structural material. Thus, one aspect of the present invention relates to the structural material comprising the MDB of the invention.

Moreover, the MDB of the invention may be used for repairs, structural or non-structural parts or coatings in the aeronautical field.

In other possible application, the MDB of the present invention may serve as a self-cleaning material. Thus, one aspect of the invention relates to the self-cleaning material comprising the MDB of the invention.

In other possible application, the MDB of the present invention may serve as protective material against UV radiation.

The MDB of the invention may be also used to produce parts of an aircraft, such as an aircraft fuel tank, a fuel tank conduit and/or a gasket. Thus, one aspect of the invention relates to an aircraft fuel tank, a fuel tank conduit and/or a gasket comprising the multifunctional diffusion barrier of the invention. In one preferred embodiment, the invention relates to an aircraft fuel tank, a fuel tank conduit and/or a gasket coated with the multifunctional diffusion barrier of the invention.

EXAMPLES

Production of an MDB of the Invention Containing a Bi-Component Epoxy Resin

An MDB of the invention containing a bi-component epoxy resin (resin+hardener) is prepared as follows (see FIG. 3C):

2D graphene material (average lateral size: 50 microns and surface area: 20 m2/g) is mixed with an epoxy resin (Araldite LY 5052) with a DISPERMAT VL-1 for 15 minutes at 5500 rpm to generate a big shear force to help the mixing. The percentage of 2D graphene material in the epoxy resin is 7%. The percentage is calculated with respect to the total amount of composite: epoxy resin+hardener+filler).

After the dispersion of the 2D graphene material inside the epoxy resin, the mixture is homogenized by using a three-roll mixer, 5 times at 75 rpm.

A hardener (Aradur CH5052) is added to the epoxy resin loaded with the 2D graphene material, and the mixture is homogenized with a mixer (DISPERMAT VL-1) for 10 minutes at 100 rpm to obtain a reinforced polymer. The concentration of the hardener is 30% of the epoxy resin.

A second reinforced polymer of 2D graphene material (average lateral size: 50 microns and surface area: 20 m2/g) and an epoxy resin is prepared in the same way, following steps (1), (2) and (3), with a different amount of 2D graphene material of 0.5%.

The resulting reinforced polymers are cast in a mold one on top of the other.

The cast reinforced polymer stack is heated first at 40° C. for 20 minutes and then at 80° C. for two hours for curing. A gradient concentration of the 2D graphene material is created by thermal diffusion between adjacent layers of the organic polymers.

The resulting MDB results to be suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing a Bi-Component Epoxy Resin A MDB of the invention containing a bi-component epoxy resin (resin+hardener) is prepared as in example 1 except for step (4) wherein in the second polymer there is no 2D graphene or 2D graphene derivative material (0%) (see FIG. 3D).

Production of an MDB of the Invention Containing a Mono-Component Epoxy Resin

An MDB of the invention containing a mono-component epoxy resin is prepared as follows (see FIG. 3C):

2D graphene material (average lateral size 50 microns and surface area: 20 m2/g) is dispersed inside a mono-component epoxy resin (Hexcel RTM6) with a DISPERMAT VL-1 at 80° C. for 15 minutes at 5500 rpm to generate a big shear force to help the mixing. The percentage of 2D graphene material is 7% by weight.

A second reinforced polymer is prepared in the same way, following step (1), with a different amount of graphene. The percentage of additive included is 0.5% by weight.

The resulting reinforced polymers are cast in a mold one on top of the other.

The cast reinforced polymer stack is heated before at 100° C. for 20 minutes and then cured at 180° C. for two hours. A gradient concentration of the 2D graphene material is created by thermal diffusion between adjacent layers of the organic polymers.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing a Mono-Component Epoxy Resin A MDB of the invention containing a mono-component epoxy resin is prepared as in example 3 except for step (2) wherein in the second polymer there is no 2D graphene or 2D graphene derivative material (0%) (see FIG. 3D).

Production of Another Embodiment of MDB of the Invention Containing a Mono-Component Epoxy Resin Another MDB of the invention containing a mono-component epoxy resin is prepared as follows (see FIG. 3E):

2D graphene material (average lateral size 50 microns and surface area: 20 m2/g) is dispersed inside a mono-component epoxy resin (Hexcel RTM6) with a DISPERMAT VL-1 at 80° C. for 15 minutes at 5500 rpm to generate a big shear force to help the mixing. The percentage of 2D graphene material included is 0.5%.

The reinforced polymer of step (1) is cast in a mold.

A second reinforced polymer is prepared by mixing 2D graphene material (lateral size 50 microns and surface area: 20 m2/g) and a mono-component epoxy resin (Hexcel RTM6). The epoxy resin is diluted in acetone to help the mixing (for example: resin:acetone—1:10). The dispersion is homogenized with a three-roll mixer, 3 times at 60 rpm. The percentage of 2D graphene material included is 50% with respect to the total amount of composite: epoxy resin+2D graphene material.

(4) The second reinforced polymer is cast in the mold on the first polymer.

The polymer stack is heated before at 60° C. to remove acetone and then at 180° C. for two hours for curing. A gradient concentration of the 2D graphene material is created by thermal diffusion and solvent migration between adjacent layers of the organic polymers.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing a Mono-Component Epoxy Resin An MDB of the invention containing a mono-component epoxy resin is prepared as in example 5 except for step (1) wherein in the first polymer there is no 2D graphene or 2D graphene derivative material (0%) (see FIG. 3F).

Production of Another MDB of the Invention Containing a Mono-Component Epoxy Resin An MDB of the invention containing a mono-component epoxy resin is prepared as follows (see FIG. 3D):

A mono-component epoxy resin (Hexcel RTM6) is cast in a mold.

2D graphene material (average lateral size 50 microns and surface area: 20 m2/g) is deposited on the mono-component epoxy resin of step (1). The percentage of 2D graphene material included is 10% over the total weight of the barrier.

The cast reinforced polymer stack is heated before at 100° C. for 20 minutes and then at 180° C. for two hours for curing. A gradient concentration of the 2D graphene material is created by thermal diffusion between adjacent layers of the organic polymers.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of an MDB of the Invention Containing a Multilayer Structure

A MDB of the invention containing a multilayer structure is prepared as follows (see FIG. 2C):

A mono-component epoxy resin (Hexcel RTM6) is cast in a mold and is cured at 180° for two hours.

2D graphene material (lateral size 50 microns and surface area: 20 m2/g) is dispersed inside a mono-component epoxy resin (Hexcel RTM6) with a DISPERMAT VL-1 at 80° C.

for 15 minutes at 5500 rpm to generate a big shear force to help the mixing. The percentage of 2D graphene material included is 0.5%

The resulting reinforced polymer is cast in the mold over the first resin of step (1) and is cured at 180° for two hours.

A third polymer is prepared in the same way, following step (2), with a different amount of graphene and eventually a different lateral size. In this example, the percentage of 2D graphene material included is 7% and the lateral size is 50 microns.

The material prepared in step (4) is cast in the mold on the second cured reinforced polymer of step (3).

The resulting stack of polymers is cured at 180° for two hours.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of an MDB of the Invention Containing Carbon Fibers

A MDB of the invention containing carbon fibers is prepared as follows:

A unidirectional prepreg, constituted by carbon fibers impregnated with a monocomponent resin (Hexcel RTM6), is deposited in a mold.

2D graphene material (average lateral size 50 microns and surface area: 20 m2/g) is dispersed inside a mono-component epoxy resin (Hexcel RTM6) with a DISPERMAT VL-1 at 80° C. for 15 minutes at 5500 rpm to generate a big shear force to help the mixing. The percentage of 2D graphene material included is 7%.

The resulting reinforced polymer is cast in the mold on the prepreg.

The resulting reinforced polymer stack is heated before at 100° C. for 20 minutes and then at 180° C. and 7 bar gauge for two hours for curing. A gradient concentration of the 2D graphene material is created by thermal diffusion.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like, for example, electrical or mechanical processes, different order of combining the materials, timing, etc.

Production of Another MDB of the Invention Containing Carbon Fibers

Another MDB of the invention containing carbon fiber is prepared as follows:

A unidirectional prepreg, constituted by carbon fibers impregnated with a monocomponent resin (Hexcel RTM6), is deposited in a mold.

A reinforced polymer is prepared by mixing 2D graphene material (lateral size 50 microns and surface area: 20 m2/g) and a mono-component epoxy resin (Hexcel RTM6). The epoxy resin is diluted in acetone to help the mixing (for example: resin:acetone—1:10). The dispersion is homogenized with a three-roll mixer, 3 times at 60 rpm. The percentage of 2D graphene material included is 50% with respect to the total amount of composite: epoxy resin+2D graphene material.

The reinforced polymer is cast in the mold on the prepreg.

The polymer stack is heated before at 60° C. to remove acetone and then at 180° C. for two hours and 7 bar gauge for curing. A gradient concentration of the 2D graphene material is created by thermal diffusion and solvent migration.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing Carbon Fibers

An MDB of the invention containing carbon fibers is prepared as follows:

2D graphene material (average lateral size 50 microns and surface area: 20 m2/g) is deposited on a unidirectional prepreg, constituted by carbon fibers impregnated with a mono-component resin (Hexcel RTM6). The percentage of 2D graphene material is 1% over the total weight of the prepreg.

The material is heated at 100° C. for 20 minutes and then the exceeding 2D graphene material is removed.

One or eventually more layers (6 layers) of the material of step (1-2) are deposited in a mold with 0/90 degree fiber orientation.

The stack is cured at 180° C. and 7 bar gauge for two hours.

A gradient concentration of the 2D graphene material is created by thermal diffusion between adjacent layers of the organic polymers.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing Carbon Fibers

An MDB of the invention containing carbon fibers is prepared as follows:

A carbon dry fabric (HexForce G0904) is deposited in a mold at 100°.

2D graphene material (average lateral size 50 microns and surface area: 20 m2/g) is dispersed inside a mono-component epoxy resin (Hexcel RTM6) with a DISPERMAT VL-1 at 80° C. for 15 minutes at 5500 rpm to generate a big shear force to help the mixing. The percentage of 2D graphene material included is 7%.

The material prepared in step (2) is cast on the carbon dry fabric at 100°.

A second reinforced polymer is prepared in the same way, following steps (2), with a different amount of graphene. The percentage of additive included is 0.5%.

The material prepared in step (4) is cast on the material of step (3) at 100°.

The reinforced composite stack is heated before at 100° C. for 20 minutes and then at 180° C. and 2 bar gauge for two hours for curing. A gradient concentration of the 2D graphene material is created by thermal diffusion between adjacent polymeric layers.

The resulting MDB is suitable for repairs, structural or non-structural parts or coatings in the aeronautical field.

The process used to obtain the composite is a non-limiting example, several modifications can be employed like different organic polymers, different number of layers, different dispersing processing, different treatments to obtain the gradient concentration, like for example electrical or mechanical processes, different order of combining the materials, timing, etc.

Production of Another MDB of the Invention Containing Carbon Fibers

An MDB of the invention containing carbon fibers is prepared as in example 12 except for the concentration of 2D graphene material in step (2) and step (3) which is in this example respectively 0.5% and 7%.

Production of Another MDB of the Invention with Other Concentrations of 2D Graphene Material A MDB of the invention is prepared as in examples 1, 2, 3, 4, 7, 8, 9, 12, 13, and wherein the concentration of 2D graphene material equal to 7% wt. is replaced with one of the following concentrations: 2%, 5%, 10%, 20%, 30% wt.

Otherwise, A MDB of the invention is prepared as in examples 5, 6, 10, and wherein the concentration of 2D graphene material equal to 50% wt. is replaced with one of the following concentrations: 40%, 60%, 70%, 80%, 90% wt.

Otherwise, A MDB of the invention containing a 2D graphene material is prepared as in examples 11 and wherein the concentration of 2D graphene material equal to 1% wt. is replaced with one of the following concentrations: 0.01%, 0.1%, 0.5%, 2%, 5% wt.

Production of Another MDB of the Invention with 2D Graphene Material with Different Lateral Size and Surface Area A MDB of the invention is prepared as in examples from 1 to 14, except that the 2D graphene material used has a lateral size selected among: 1, 10, 25, 100 micron and a surface area selected among: 100, 200, 500, 750, 1000 m$^2$/g.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A multifunctional diffusion barrier comprising at least an organic polymer and between 0.01 and 99.9% by weight of a 2D graphene or 2D graphene derivative material,
wherein an average lateral size of said 2D graphene or 2D graphene derivative material is of between 0.1 µm and 1 mm and has a surface area between 20 and 2600 m2/g; and
wherein the multifunctional diffusion barrier comprises a gradient concentration of the 2D graphene or 2D graphene derivative material.

2. The multifunctional diffusion barrier according to claim 1, wherein the gradient concentration of the 2D graphene or 2D graphene derivative material is oriented in a perpendicular direction with respect to a plane of an outermost surface of the multifunctional diffusion barrier.

3. The multifunctional diffusion barrier according to claim 1, wherein the organic polymer is an epoxy resin or a bi-component epoxy resin of an epoxy resin and a hardener.

4. The multifunctional diffusion barrier according to claim 1, wherein the 2D graphene or 2D graphene derivative material is selected from graphene, graphene nanoplatelets, graphene nanosheets, graphene nanoribbons, graphene oxide, exfoliated graphene, reduced graphene oxide, multilayer graphene and combinations thereof.

5. The multifunctional diffusion barrier according to claim 1, wherein the 2D graphene or 2D graphene derivative material is chemically or supramolecular functionalized with molecules containing hydrophobic groups selected from aryl chains, alkyl chains, fluorinated or partially fluorinated groups, silicon derivatives and combinations thereof.

6. The multifunctional diffusion barrier according to claim 1, wherein the 2D graphene or 2D graphene derivative material presents a lateral size over 50 µm and a surface area of at least 70 m2/g.

7. The multifunctional diffusion barrier according to claim 1, further comprising a 2D material selected from h-BN, MoS2, NbSe2, WS2, NiS2, MoSe2, WSe2, VSe2, TiS2 and combinations thereof.

8. The multifunctional diffusion barrier according to claim 1, wherein a majority of 2D graphene or graphene derivative material is located on an outermost surface of said multifunctional diffusion barrier.

9. The multifunctional diffusion barrier according to claim 1, wherein an outermost surface of said multifunctional barrier is patterned.

10. The multifunctional diffusion barrier according to claim 1, wherein the 2D graphene or 2D graphene derivative material and the organic polymer form a tridimensional network.

11. The multifunctional diffusion barrier according to claim 1, further comprising natural or synthetic textiles or fabrics, a prepreg layer, carbon or glass fibers, whiskers, platelets, particles or combinations thereof.

12. The multifunctional diffusion barrier according to claim 1,
wherein said multifunctional diffusion barrier is a multi-layered structure containing two or more layers, wherein each layer comprises an organic polymer and 2D graphene or 2D graphene derivative material having an average lateral size of between 0.1 µm and 1 mm; and
wherein a content of said 2D graphene or 2D graphene derivative material in each layer is a constant content of between 0 and 99.9% by weight, and a 2D graphene or 2D graphene derivative material content is increased or decreased in each layer with respect to a previous layer, so that a stepwise gradient concentration of the 2D graphene or 2D graphene derivative material in a perpendicular direction with respect to a plane of an outermost surface is present.

13. The multifunctional diffusion barrier according to claim 12, wherein the organic polymers of the layers are the same or different.

14. The multifunctional diffusion barrier according to claim 1, further comprising a prepreg layer, a fiber textile or a fabrics, and wherein the gradient concentration of the 2D graphene or 2D graphene derivative material is oriented in a perpendicular direction with respect to said prepreg layer, fiber textile or fabric.

15. The multifunctional diffusion barrier according to claim 1, further comprising carbon fibers or glass fibers, and wherein the gradient concentration of the 2D graphene or 2D graphene derivative material is radially oriented along the carbon fibers or glass fibers.

16. The multifunctional diffusion barrier according to claim 1, wherein a form of said barrier is selected from bulk material, a foil, a thin film, a prepreg, a laminate, a coating, a roll, a sheet, a layer, paint, primer, a reinforced plastic or resin and an additive.

* * * * *